United States Patent
Ladikov et al.

(10) Patent No.: US 9,444,832 B1
(45) Date of Patent: Sep. 13, 2016

(54) SYSTEMS AND METHODS FOR OPTIMIZING ANTIVIRUS DETERMINATIONS

(71) Applicant: AO KASPERSKY LAB, Moscow (RU)

(72) Inventors: Andrey V. Ladikov, Moscow (RU); Alexander V. Liskin, Moscow (RU)

(73) Assignee: AO KASPERSKY LAB, Moscow (RU)

(*) Notice: Subject to any disclaimer, the term of this patent is extended or adjusted under 35 U.S.C. 154(b) by 0 days.

(21) Appl. No.: 15/015,764

(22) Filed: Feb. 4, 2016

(30) Foreign Application Priority Data

Oct. 22, 2015 (RU) .................... 2015145266

(51) Int. Cl.
| | |
|---|---|
| G06F 21/00 | (2013.01) |
| H04L 29/06 | (2006.01) |
| G06F 11/00 | (2006.01) |
| G06F 12/14 | (2006.01) |
| G06F 12/16 | (2006.01) |
| G08B 23/00 | (2006.01) |

(52) U.S. Cl.
CPC ....... H04L 63/1416 (2013.01); H04L 63/1433 (2013.01)

(58) Field of Classification Search
None
See application file for complete search history.

(56) References Cited

U.S. PATENT DOCUMENTS

| | | | |
|---|---|---|---|
| 5,696,822 A | 12/1997 | Nachenberg | |
| 5,826,013 A | 10/1998 | Nachenberg | |
| 7,523,500 B1 | 4/2009 | Szor et al. | |
| 7,664,754 B2 | 2/2010 | Shipp | |
| 8,181,251 B2 | 5/2012 | Kennedy | |
| 8,549,647 B1 | 10/2013 | Mason et al. | |
| 8,621,625 B1 | 12/2013 | Bogorad et al. | |
| 8,745,743 B2 | 6/2014 | Turbin et al. | |
| 9,015,814 B1 | 4/2015 | Zakorzhevsky et al. | |
| 9,043,907 B1 | 5/2015 | Levchenko et al. | |
| 9,043,915 B2 | 5/2015 | Tatarinov | |
| 9,047,466 B2 | 6/2015 | Zhou et al. | |
| 9,055,093 B2 | 6/2015 | Borders | |
| 2006/0129603 A1* | 6/2006 | Park | G06F 21/561 |
| 2006/0230451 A1 | 10/2006 | Kramer et al. | |
| 2007/0006300 A1* | 1/2007 | Zamir | G06F 21/563 726/22 |
| 2007/0079377 A1 | 4/2007 | Pagan | |
| 2008/0115219 A1* | 5/2008 | Kim | G06F 21/563 726/25 |
| 2008/0127038 A1* | 5/2008 | Park | G06F 9/445 717/100 |
| 2009/0013405 A1 | 1/2009 | Schipka | |
| 2013/0291111 A1* | 10/2013 | Zhou | G06F 21/562 726/23 |
| 2014/0298470 A1 | 10/2014 | Yablokov et al. | |
| 2015/0096027 A1* | 4/2015 | Romanenko | G06F 21/56 726/23 |
| 2015/0244733 A1 | 8/2015 | Mohaisen et al. | |
| 2015/0288707 A1* | 10/2015 | Liu | H04L 63/145 726/24 |

FOREIGN PATENT DOCUMENTS

RU 2491623 8/2013

* cited by examiner

*Primary Examiner* — Shin-Hon Chen
(74) *Attorney, Agent, or Firm* — Patterson Thuente Pederson PA (57) ABSTRACT

Systems and methods for optimizing an antivirus determination for executable files. Optimization by excluding from an antivirus check executable files such as dynamic libraries and/or resource files that do not contain executable code speeds up the overall antivirus determination. An optimization system generally includes an antivirus system. The antivirus system generally includes a check tool and an executable file detection system. The executable file detection system generally includes a breakdown tool, an analysis tool, and a database. The antivirus system can be operably coupled to an antivirus server via the Internet.

22 Claims, 3 Drawing Sheets

SYSTEMS AND METHODS FOR OPTIMIZING ANTIVIRUS DETERMINATIONS

RELATED APPLICATION

This Application claims the benefit of Russian Federation Patent Application No. 2015145266 filed Oct. 22, 2015, which is fully incorporated by reference herein.

TECHNICAL FIELD

Embodiments relate generally to antivirus checks for executable files. More particularly, embodiments relate to systems and methods for strategically excluding executable files from antivirus checks in order to optimize the antivirus evaluation process.

BACKGROUND

Executing an executable file or a Portable Executable (PE) file, each of which can include a dynamic library or a Dynamic Link Library (DLL), can be hazardous for computer system users. Malicious code is primarily spread using such executable files (for example, as viruses and Trojan programs). Therefore, prior to executing or running an executable file, an antivirus determination (or check) of such files is recommended. Traditional antivirus checks can be based both on simple or complex check methods. For example, a simple check can be a signature scan, which allows the detection of known malicious programs from among all programs. However, a signature scan can be a time-consuming procedure, as the antivirus database that is utilized for the check is often very large. In another example, a complex check can include an analysis of the behavior of the executable files. Such systems can use a code emulator with an analytical module designed for deep analysis of files. The aforementioned checks ensure the security of both computer system resources and personal (including confidential) user data. Varying amounts and types of computer resources (which are typically limited) are needed for the aforementioned checks, depending on the type of check utilized.

In addition, the number of executable files on today's computer systems is constantly growing, which affects the time required for the antivirus checks of all executable files and the resources that need to be spent in order to perform the relevant checks. As a result, approaches that decrease the computer system resources required for an antivirus check are important.

Some of the approaches that optimize antivirus checks typically include the use of so-called whitelists or blacklists, or are based on the tracking of file modification (for example, by time stamps) after which a check will be performed. These approaches can also be conducted based on a particular type of executable file, such as: object code, PE-format executable files, macros, or scripts, and so on.

For example, U.S. Pat. No. 7,490,352 describes an approach that checks whether an executable file is trusted at the moment the execution of the executable file begins. That approach includes determining whether the file being checked belongs to a malicious file type and verifying the integrity of the file and the reliability of the source which sends or runs the file. However, these approaches have one very substantial drawback; particularly, the need to pre-build the aforementioned lists. Therefore, the executable files included in the above-mentioned lists have been, at least once, subjected to a deeper anti-virus check, which usually involves a determination using all available anti-virus technologies, including the aforementioned ones. Accordingly, hardware resources and time resources have therefore also been allocated for the deeper check and in order to build the lists. However, computing systems often require that an antivirus check of new executable files be performed as fast as possible and using the least computer resources possible. "New executable files" mean that the above-mentioned lists do not include such files or any information about such files.

Therefore, systems and methods that reduce the duration of antivirus determinations are needed, and particularly for those checks that include executable files encountered for the first time ("new executable files"). Accordingly, there is a need for systems and methods that optimize antivirus checks, including systems and methods that allow, prior to an antivirus check of executable files, for the detection and exclusion from further antivirus checks, those executable files which can be determined to be safe.

SUMMARY

Embodiments are configured to optimize antivirus checks of files by excluding executable files and the like; particularly, dynamic libraries and/or resource files, such as New Executable format (NE) files, from the antivirus check. As a result, the antivirus check is sped up by excluding those files that do not contain executable code.

In an embodiment, a system for excluding an executable file not having executable code from an antivirus check comprises a check tool configured to receive an executable file for an antivirus check, send the executable file to a breakdown tool, and exclude from the antivirus check an executable file not having executable code, based on a decision received from an analysis tool; the breakdown tool configured to analyze a structure of the executable file and identify a format of the executable file by checking a heading of the executable file, and send information about the format of the executable file and the structure of the executable file to the analysis tool; the analysis tool configured to select a list of conditions from a database based at least on the information about the format of the executable file, the list of conditions including a plurality of conditions for the analysis of the structure of the executable file, perform an analysis of the structure of the executable file using the selected list of conditions, the analysis including checking whether each condition from the selected list of conditions is met, build a result based on the analysis, the result including information on whether each checked condition is met, issue a decision based on the result, wherein the decision is of the absence of executable code in the executable file when all conditions from the list of conditions are met, send the issued decision to the check tool; and a database operably coupled to the analysis tool and configured to store lists of conditions.

In another embodiment, a method for excluding an executable file not having executable code from an antivirus check comprises receiving, using a check tool, the executable file for an antivirus check; analyzing, using a breakdown tool, a structure of the executable file, and identifying a format of the executable file by checking a heading of the executable file; selecting, using an analysis tool, a list of conditions from a database based at least on the information about the format of the executable file, the list of conditions including a plurality of conditions for the analysis of the structure of the executable file; analyzing, using the analysis tool, the structure of the executable file using the selected list of conditions, the analysis including checking whether each condition from the selected list of conditions is met; building a result with the check tool based on the analyzing, the result including information on whether each checked condition is met; issuing a decision based on the result, wherein the decision is of the absence of executable code in the executable file when all conditions from the list of conditions are met; and excluding from the antivirus check, using the check tool, the executable file not having executable code, based on the issued decision.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Figure 1:
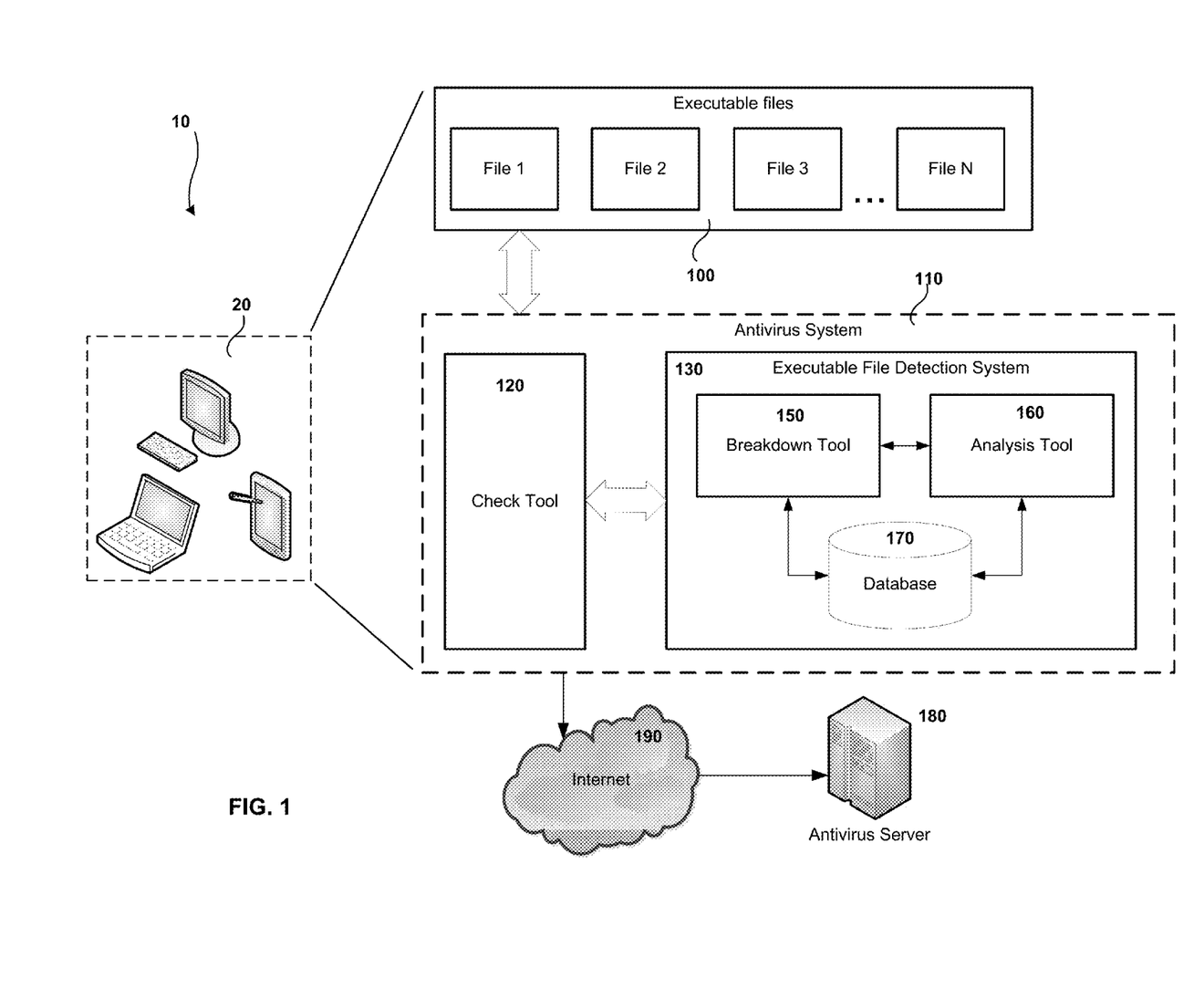
FIG. 1 is a block diagram of a system for optimizing an antivirus check of executable files, according to an embodiment.

FIG. 1 is a block diagram of a system 10 for optimizing an antivirus check of executable files, according to an embodiment. In particular, optimization system 10 of FIG. 1 is configured to exclude one or more executable files 100 from an antivirus check on the behalf of or for the benefit of a user device 20. User device 20 can comprise a personal computer, laptop computer, tablet, personal digital assistant, mobile device, or any other computing device configured to execute executable files. As depicted, optimization system 10 generally comprises an antivirus system 110 for excluding one or more executable files 100.

As will be described further below, antivirus system 110 generally comprises a check tool 120 and an executable file detection system 130. Executable file detection system 130 generally comprises a breakdown tool 150, an analysis tool 160, and a database 170. Antivirus system 110 can be operably coupled to an antivirus server 180 via the Internet 190, though other networked configurations are, of course, possible.

In an embodiment, antivirus check optimization system 10 is configured to optimize an antivirus check by the exclusion of an executable file from the antivirus check. In an embodiment, executable file 100 run processing is intercepted by the antivirus system 110. In another example, optimization system 10 can also be utilized where the antivirus check of executable files 100 is performed using such technologies as On Demand Scanning (ODS) or Host-based Intrusion Prevention System (HIPS). As will be readily understood by one skilled in the art, the examples of timing, antivirus check, and/or exclusion are provided herein merely by way of example and are not intended to limit the scope of the application.

In addition, FIG. 1 depicts an example interaction between the tools of executable file detection system 130 as utilized by antivirus system 110. As described herein, the tools or modules of antivirus system 110 can be utilized during an antivirus check of executable files 100, which thus allows for the detection of executable files 100 and subsequent exclusion from the antivirus check. In embodiments, an "executable file" can comprise any file including or matching PE or NE formats, or any file including executable code. In particular, PE format files can include dynamic libraries such as a Dynamic Link Library (DLL). NE format files (hereinafter referred to as "NE files") can include resource files (libraries), such as files containing a Windows screen program (also known as a background file), can include files having an "scr" extension.

As depicted in FIG. 1, an embodiment of antivirus system 110 includes a check tool 120 and an executable file detection system 130. Check tool 120 is configured to perform an antivirus check of files, including executable files 100, in order to detect malicious files. In embodiments, check tool 120 is further configured for the subsequent removal or repair of malicious files. Check tool 120 can utilize classic file checking methods, such as a signature analysis using one or more antivirus databases. In other embodiments, check tool 120 can utilize more complex checking methods. Complex checking methods can include emulation of files, which comprises a parsing of byte code into commands, wherein each command is run on a virtual copy of the computer. In an embodiment, emulation includes monitoring, when the commands are run, the program's behavior or activity. In another example, complex checking methods can include a heuristic analysis. In an embodiment, a heuristic analysis includes an analysis of information, such as past events, in order to detect unknown malicious programs. In another example, complex checking methods includes utilizing remote services, such as a reputation service (e.g. a trusted server containing information on the files). It should be noted that all the above-mentioned checks are resource-consuming and/or time-consuming operations. Detection system 130, however, allows for a determination of whether executable files 100, such as dynamic libraries and NE files, contain executable code. In an embodiment, executable files 100 which do not contain executable code are considered to be safe files. Accordingly, there is no need to perform an antivirus check of a safe executable file.

However, not all executable file formats match a particular safety criteria, such as the absence of executable code. For this reason, an embodiment of system 10 can pre-build a list of file formats containing only the file formats that can match the specified safety criterion. For example, files of only a particular format or formats that are included in the format list are sent to detection system 130 for a safety determination. According to an embodiment, the format list is modifiable such that detection system 130 can be tailored to check particular files or to disregard particular files. Examples of file formats which are contained in the format list are dynamic libraries and NE files (for example, background files with the "scr" extension) for various operating systems (such as Windows, Linux and Mac OS).

In another embodiment, the check of the file format for availability of information about a type being checked in the file format list can be performed within detection system 130. For example, check tool 120 can send the executable file to detection tool 130. Detection system 130, using breakdown tool 150, can determine the format of the received file.

In order to perform an antivirus check, check tool 120 can intercept a program execution and send executable file(s) 100 (for example, dynamic libraries) to detection system 130. For example, when an executable file, such as Notepad.exe application, is run, check tool 120 intercepts during the time the application loads dynamic libraries and opens other files. In one embodiment, the type of executable is determined based on the executable file format.

As depicted in FIG. 1, detection system 130 includes breakdown tool 150, analysis tool 160 and database 170. Breakdown tool 150 is configured to analyze the structure of an executable file (for example, a dynamic library). In an embodiment, a structure determination comprises determining at least the format of the executable file. In an embodiment, for dynamic libraries, the format can be one of the following: "Native DLL" or ".NET Assembly DLL".

In an embodiment, breakdown tool 150 is further configured to determine if sections are present which are contained in the structure of the executable file 100 and which can be executed. For example, if a section can be executed, such a determination can be made based on an executable status (flag) of the section. Breakdown tool 150 can be further configured to determine the address of the start of the execution of the program code (i.e. the entry point) of the executable file. Breakdown tool 150 can provide information about the format of executable file 100 (dynamic library) and its structure to analysis tool 160.

Analysis tool 160 is configured to analyze an executable file, for example, a dynamic library (hereinafter referred to as "the DLL file"), in accordance with a list of conditions. In an embodiment, the list of conditions is chosen from database 170 based on the file format information received from breakdown tool 150. Thus, there will be one list of conditions for each file format, in an embodiment. The list of conditions can include conditions for analysis of the structure of the executable file (dynamic library). Examples of lists of conditions are provided in examples below.

The analysis itself consists of checking that each condition from the list of conditions is met for the particular file being checked (the DLL file). After that, analysis tool 160 can build an analysis result. An analysis result can comprise information on whether each condition from the list of conditions has been met. If all conditions are met, analysis tool 160 issues a decision of the absence of executable code and finds the file being checked to be safe. Otherwise, if at least one condition is not met, analysis tool 160 issues a decision of the presence of executable code and finds the file being checked to be suspicious. As a result, the file will subsequently be subjected to an antivirus check. Analysis tool 160 then provides the issued decision to check tool 120. Accordingly, in an embodiment where check tool 120, obtains a decision of the absence of executable code, check tool 120 excludes the executable file from an antivirus check. Otherwise, if check tool 120 obtains a decision of the presence of executable code, check tool 120 will perform an antivirus check and issue a decision on the safety or maliciousness of the file.

In an embodiment, for at least each format in the format list, database 170 is configured to store one list of conditions to be used in the analysis. Accordingly, when a new format is added to the format list, a new list of conditions for the new format can also be added to database 170. Database 170 can be also populated without respect to the format list, such that lists of conditions are populated ad-hoc or without a one-to-one ratio of format to list of conditions.

In another embodiment, a specific type of antivirus check can be set based on a particular unmet condition. For example, for a DLL file, a condition can indicate that the address and the size of the exports section must equal zero, i.e. the section must be empty. If, however, the exports section contains any information (for example, what function is required for the execution of the file and from what address this function can be received), this indicates an unmet or failed condition. Consequently, this information from the section can be used during an antivirus check, for example, using signature analysis based on a relevant "whitelist" or "blacklist" of files or file signatures.

As shown in FIG. 1, antivirus system 110 is configured to be operably coupled to antivirus server 180. In an embodiment, the interface between antivirus system 110 and antivirus server 180 allows for the exchange of information via various networks such as the Internet 190. For example, antivirus server 180 can make transmit or otherwise make available information related to new formats for the format list or new or modified lists of conditions. Further, antivirus system 110 can transmit or otherwise make available information about the checked and excluded executable files (dynamic libraries) to antivirus server 180.

Discussed below is an example of exclusion of executable files of the Notepad.exe application from an antivirus check. When the Notepad.exe application is run, dynamic libraries containing resources or functions required for the Notepad.exe application to function are also loaded. For example, one of the dynamic libraries is the Notepad.exe.mui dynamic library. In operation, antivirus system 110, using check tool 120, intercepts the loading process of the dynamic library Notepad.exe.mui. In an embodiment, check tool 120 can contain a format list as described above. In this embodiment, check tool 120 is configured to send or otherwise make available to breakdown tool 150 only the files matching those in the format list. In this example, the Notepad.exe.mui dynamic library is a DLL format file (hereinafter referred to as "DLL file") that matches a format in the format list. Accordingly, check tool 120 sends the dynamic library to detection system 130. In particular, Notepad.exe.mui is sent specifically to breakdown tool 150.

Upon receipt of the DLL file, breakdown tool 150 "breaks down" or analyzes the structure of the DLL file. During the breakdown of the DLL file structure, the DLL file format is determined (confirmed) by checking the header of the DLL file in the field "characteristics." In the specified field, a corresponding flag is detected (in a DLL file for example, the field value is set for the IMAGE_FILE_DLL structure). For the DLL file, breakdown tool 150 is configured to determine that the file belongs to a "Native DLL" dynamic library type. After that, breakdown tool 150 sends information including the format of the DLL file (dynamic library) 100 and the DLL file structure to analysis tool 160.

In an embodiment, breakdown tool 150 is configured to check whether executable sections are present. For example, breakdown tool 150 can determine whether particular sections can be executed. For an identified executable section, breakdown tool 150 is further configured to check the entry point or the start of program code execution. This data (check of the sections and of the entry point) can be additional criteria sent to the analysis tool 160 along with the aforementioned information and DLL file structure. For example, for Native DLL format dynamic libraries, the following transmission criteria can be mandatory: the entry point must indicate a zero address (0x00) and there have no execution status (flag) in the sections array for each executable section. Otherwise, if at least one criterion is not met, breakdown tool 150 does not send the aforementioned information and the DLL file structure to analysis tool 160 and instead notifies check tool 120. Accordingly, check tool 120 is performs an antivirus check. In addition, in another embodiment, the specified criteria can be conditions included in at least one list of conditions stored in database 170.

Analysis tool 160 selects a list of conditions from database 170 based on the information received from breakdown tool 150 about the DLL file format. The selection of the list of conditions is made in accordance with the specific file format. For the above-mentioned DLL file (Notepad.exe.mui), the list of conditions is selected in accordance with the "Native DLL" format. For example, the list of conditions can contain the following conditions, intended for analysis of the IMAGE_DATA_DIRECTORY structures array:
  the address and the size of the "Resource table" section (resource section) do not equal zero, i.e. information about resources is present;
  the address and the size of the "Export table" section (export section) equal zero, i.e. there is no information about the exportable functions;
  the address and the size of the "Import table" section (import section) equal zero, i.e. there is no information about the importable functions;
  the address and the size of the "Import address table" section (import table section) equal zero, i.e. there is no import address table; and
  the address and the size of the "Thread local storage" (TLS) table (thread memory section) equal zero, i.e. there are no TLS.

In an embodiment, the list of conditions comprises at least three of the aforementioned conditions. In other embodiments, the list of conditions can comprise fewer than three of the aforementioned conditions. In other embodiments, other combinations or linked conditions can also be utilized. For example, a first condition can trigger an evaluation of a second condition. In another example, a first condition can trigger an evaluation of both a second and third condition, and so on.

Analysis tool 160 is further configured to conduct an analysis of the DLL file structure in accordance with the selected list of conditions. In an embodiment, the analysis of the file structure in accordance with the list of conditions comprises checking whether each condition from the list of conditions is met. After the analysis, analysis tool 160 builds a result. The result can contain information as to whether the conditions are met. For example, the result can comprise a binary flag as to whether all conditions are met or whether at least one condition is not met. In another example, the result can comprise data on the condition(s) that are met and the condition(s) that are not met. In such embodiments, appropriate data structures can be utilized to contain the conditional data.

Returning to the Notepad example, the result of the check of the DLL file
(Notepad.exe.mui) corresponds to the case where all conditions are met. Consequently, analysis tool 160 issues a decision of the absence of executable code and, based at least on the absence of executable code, finds the file being checked to be safe. After that, analysis tool 160 sends or otherwise makes available the issued decision to check tool 120. Check tool 120 then excludes the DLL file from the antivirus check based at least on the decision from analysis tool 160 of the absence of executable code.

In another example, a system resource file can be excluded from an antivirus check. For example, System.XML.resources.dll file from the standard Microsoft .NET Framework pack can be called. Accordingly, antivirus system 110 can intercept the loading of the System.XML.resources.dll file (hereinafter referred to as "the .NET file") using check tool 120. Subsequently, the .NET file is sent or otherwise made available to breakdown tool 150. Breakdown tool 150 then breaks down the structure of the .NET file. For example, breakdown tool 150 can determine the .NET file format by checking the file header in the field "characteristics." The presence of the relevant flag is detected or otherwise determined in the field "characteristics." Breakdown tool 150 can determine that the .NET file belongs to the ".NET Assembly DLL" dynamic library type. After that, breakdown tool 150 sends or otherwise makes available information about the format of the .NET file 100 and its structure to analysis tool 160.

Further, in an embodiment, breakdown tool 150 can also check whether executable sections (sections that can be executed) are present, and can determine the address of the entry point (the start of program code execution). This data can be sent to the analysis tool 160 along with the file structure data. For example, for the ".NET Resource DLL" dynamic libraries format, the following criteria can be mandatory:
  the presence of no more than one section that can be executed, i.e. the section has a corresponding flag in the field "characteristics"; and
  the entry point must indicate either a zero address (0x00) or an entry point in accordance with a specific section can be executed; in this case, the entry point from the .NET file indicates a call for the _CorDllMain function from the mscoree.dll library.
Otherwise, if at least one criteria is not met, breakdown tool 150 does not send .NET file format and structure information to analysis tool 160 and instead, appropriately notifies check tool 120. Accordingly, check tool 120 then performs an antivirus check. In addition, in another example, the specified criteria can also include conditions from the lists of conditions stored in database 170. In an embodiment, if the aforementioned criteria are conditions, breakdown tool 150 does not use them as additional transmission criteria.

Returning to the example where the format and structure criteria are met, analysis tool 160, as mentioned above, selects a list of conditions from database 170 based on the information received about the .NET file format from breakdown tool 150 and performs analysis of the .NET file in accordance with the selected list of conditions. For the .NET file, the list of conditions can be selected in accordance with the .NET Resource DLL format and can contain the following conditions:
  the point of entry to the _CorDllMain importable function, in which there are no other importable functions, and the _CorDllMain function itself is imported from mscoree.dll;
  no importable functions are present, except the function importable from the mscoree.dll library;
  the address and the size of the "Export table" section (export section) equal zero, i.e. there is no information about the exportable functions;
  the address and the size of the "Thread local storage" (TLS) table (thread memory section) equal zero, i.e. there are no TLS;

the address and size of the .NET MetaData section do not equal zero;

the address and the size of the ManagedNativeHeader structure equal zero, i.e. the .NET file being checked is not a NativeImage file;

the presence of manageable resources, whose size does not equal zero; and the MaskValid field does not have bits related to the tables of the following methods: MethodDef, MethodPtr, MethodSemantics, MethodImpl and MetodSpec.

In an embodiment, the list of conditions comprises at least three of the aforementioned conditions. In other embodiments, the list of conditions can comprise fewer than three of the aforementioned conditions.

After the analysis to determine whether the conditions are met, analysis tool 160 builds the relevant result. The result contains information on whether all conditions from the list of conditions are met or whether at least one condition is not met. For the example .NET file, all the above-described conditions from the list of conditions are assumed to be met. Consequently, analysis tool 160 issues a decision of the absence of executable code and finds the file being checked to be safe. After that, analysis tool 160 sends or otherwise makes available the issued decision to check tool 120. Accordingly, check tool 120 excludes the .NET file from the antivirus check based at least on the decision of the absence of executable code.

Other file formats that match the aforementioned format list can be analyzed for the purpose of being excluded from the antivirus check. For example, executable DOS files and resource files (such as font files) are examples of MZ-NE format files. Therefore, for the above-mentioned file format, the list of conditions for execution of a file analysis can correspond to the file format. For example, the list of conditions can contain the following conditions:

the number of sections equals zero (Count of file segments=0, Automatic data seg.number=0);

the address and size of the Heap allocation section (memory allocation section) equal zero;

the address and size of the Stack allocation section (location in a stack) equal zero;

the control registers are initiated with zeros (IP=0, CS=0, SP=0, SS=0); and there are no libraries for import (the ImportNames section indicates a zero address, 0x0000).

In another embodiment, analysis tool 160 is configured to perform a sequential check of conditions during file analysis. For example, a subsequent condition is checked only if the previous condition is met. Therefore, if a condition is not met, analysis tool 160 can interrupt the check and send the corresponding result to check tool 120 with a message that the check was interrupted because a condition was not met. Consequently, check tool 120, in accordance with the specified condition, will perform an antivirus check.

Figure 2:
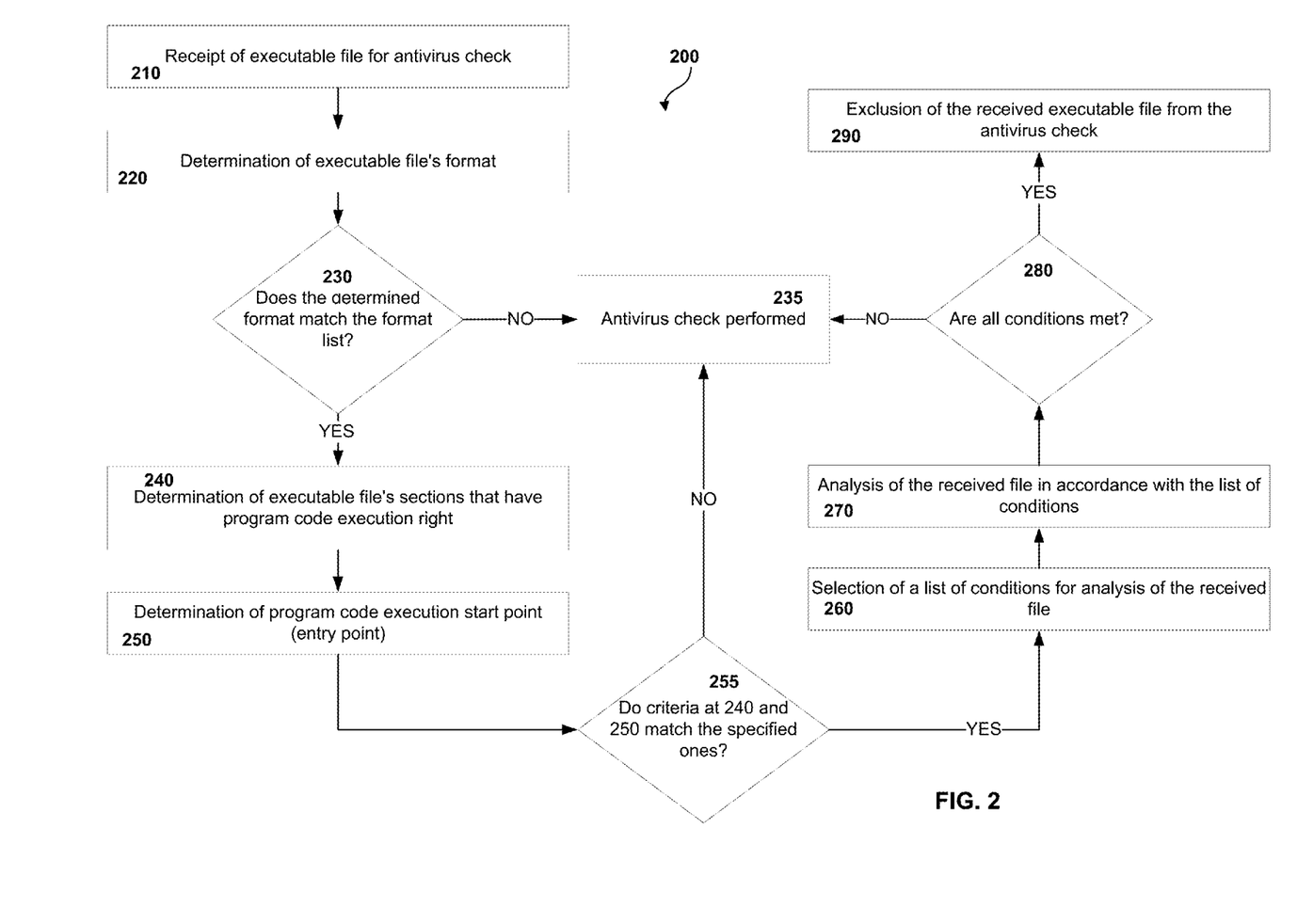
FIG. 2 is a flowchart of a method for excluding executable files from an antivirus check, according to an embodiment.

Referring to FIG. 2, a flowchart of a method 200 for excluding executable files from an antivirus check is depicted, according to an embodiment. In particular, method 200 is adapted to exclude an executable file 100, such as a dynamic library lacking executable code, from an antivirus check. During an antivirus processing, if a file is found to be executable, then, prior to an antivirus check on that file, method 200 is applied to exclude the executable file from the antivirus check. Based on the results of method 200, a decision can be made to exclude executable files from the antivirus check. As described herein, method 200 can particularly be utilized to exclude dynamic libraries and NE files.

At 210, an at-issue executable file is received for an antivirus check. In another embodiment, the run process of an executable file is intercepted. For example, check tool 120 can be utilized to receive the executable file. Check tool 120 then sends or otherwise makes available the received file to breakdown tool 150.

Breakdown tool 150, at 220, determines the format of the received file based on an analysis of the structure of the file and a detection of the corresponding file format flag in the field "characteristics" in the file header. For example, a determination can be made that the file is a dynamic library (Native DLL format), a controllable dynamic library (.NET Assembly DLL) or a NE file (MZ-NE format).

At 230, the determined file format is compared with the file format list. The format list contains formats of files that can be excluded from the antivirus check in case of successful subsequent check. If the file's format is present in the format list, breakdown tool 150 performs further breakdown or analysis of the file. Otherwise, an antivirus check of the file is performed at 235 by check tool 120.

Returning to the case where the file format matches one of the formats in the format list, breakdown tool 150 determines the sections of the program code that can be executed. In an embodiment, sections that can be executed can be marked with a relevant flag (executable status) in the field "characteristics." At 240, a determination of the program code execution start address (entry point) in the executable file at 250 is made. In this case, the aforementioned conditions (check of the sections and of the entry point) are compared with the relevant criteria for the particular file format. Examples of 240 and 250 are presented in the description of FIG. 1. For example, these conditions (check of the sections and of the entry point) for a Native DLL format file must meet the following criteria: the entry point must indicate a zero address, and there must be no execution flag in the beginning of the sections array for each executable section. If the above conditions are not met, method 200 stops at 255. Subsequently, check tool 120 is notified and the check tool 120 proceeds to 235. Otherwise, breakdown tool 150 sends information about the file format and structure to analysis tool 160.

At 260, analysis tool 160 selects a list of conditions based on the information received about the file format for the purpose of conducting the analysis.

At 270, analysis tool 160 performs an analysis in accordance with the selected list of conditions and builds an analysis result. In an embodiment, the analysis at 270 comprises checking that each condition from the list of conditions is met. An analysis result can comprise information on meeting each condition from the list of conditions.

At 280, based on the analysis result, a decision is built that all conditions are met. Thus, if at least one condition was not met, analysis tool 160 issues a decision on the presence of executable code and finds the file being checked to be suspicious and requiring an antivirus check at 235 using check tool 120. Otherwise, if all conditions are met, analysis tool 160 issues a decision of the absence of executable code and finds the file being checked to be safe. After that, analysis tool 160 sends or otherwise makes available to check tool 120 the decision of the absence of executable code.

Accordingly, based on the received decisions, check tool 120 excludes the executable file from the antivirus check at 290.

Figure 3:
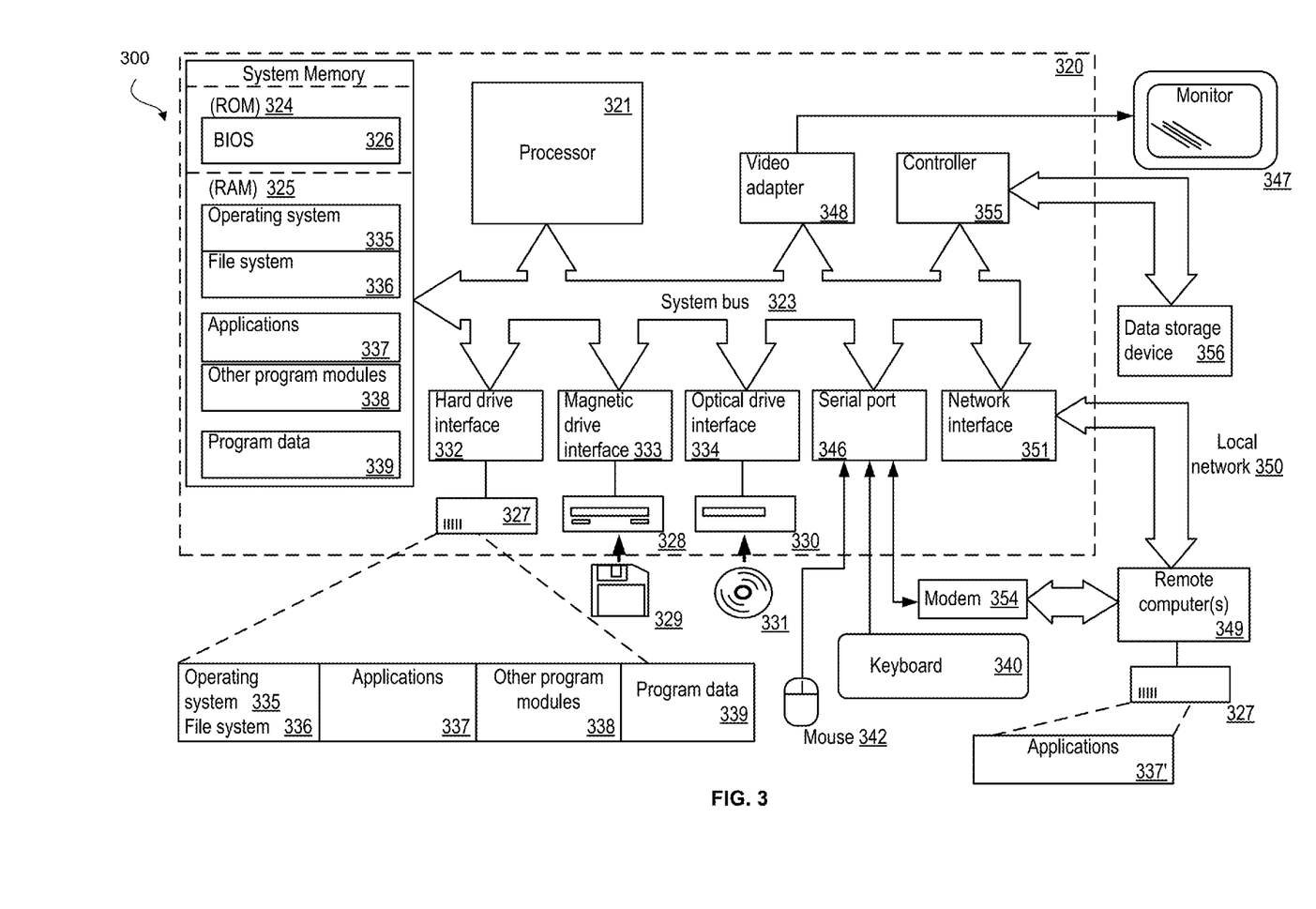
FIG. 3 is a block diagram of a computer system configured to implement embodiments.

FIG. 3 is a diagram illustrating in greater detail a computer system 300 on which aspects of the invention as described herein may be implemented according to various embodiments.

The computer system 300 can comprise a computing device such as a personal computer 320 includes one or more processing units 321, a system memory 322 and a system bus 323, which contains various system components, including a memory connected with the one or more processing units 321. In various embodiments, the processing units 321 can include multiple logical cores that are able to process information stored on computer readable media. The system bus 323 is realized as any bus structure known at the relevant technical level, containing, in turn, a bus memory or a bus memory controller, a peripheral bus and a local bus, which is able to interact with any other bus architecture. The system memory can include non-volatile memory such as Read-Only Memory (ROM) 324 or volatile memory such as Random Access Memory (RAM) 325. The Basic Input/Output System (BIOS) 326 contains basic procedures ensuring transfer of information between the elements of personal computer 320, for example, during the operating system boot using ROM 324.

Personal computer 320, in turn, has a hard drive 327 for data reading and writing, a magnetic disk drive 328 for reading and writing on removable magnetic disks 329, and an optical drive 330 for reading and writing on removable optical disks 331, such as CD-ROM, DVD-ROM and other optical media. The hard drive 327, the magnetic drive 328, and the optical drive 330 are connected with system bus 323 through a hard drive interface 332, a magnetic drive interface 333 and an optical drive interface 334, respectively. The drives and the corresponding computer information media represent energy-independent means for storage of computer instructions, data structures, program modules and other data on personal computer 320.

The system depicted includes hard drive 327, a removable magnetic drive 329 and a removable optical drive 330, but it should be understood that it is possible to use other types of computer media, capable of storing data in a computer-readable form (solid state drives, flash memory cards, digital disks, random-access memory (RAM), etc.), connected to system bus 323 through a controller 355.

The computer 320 comprises a file system 336, where the recorded operating system 335 is stored, as well as additional program applications 337, other program engines 338 and program data 339. The user can input commands and information into the personal computer 320 using input devices (keyboard 340, mouse 342). Other input devices (not shown) can also be used, such as: a microphone, a joystick, a game console, a scanner, etc. Such input devices are usually connected to the computer system 320 through a serial port 346, which, in turn, is connected to a system bus, but they can also be connected in a different way—for example, using a parallel port, a game port or a Universal Serial Bus (USB). The monitor 347 or another type of display device is also connected to system bus 323 through an interface, such as a video adapter 348. In addition to monitor 347, personal computer 320 can be equipped with other peripheral output devices (not shown), such as speakers, a printer, etc.

Personal computer 320 is able to work in a network environment; in this case, it uses a network connection with one or several other remote computers 349. Remote computer(s) 349 is (are) similar personal computers or servers, which have most or all of the above elements, noted earlier when describing the substance of personal computer 320 shown in FIG. 3. The computing network can also have other devices, such as routers, network stations, peering devices or other network nodes.

Network connections can constitute a Local Area Network (LAN) 350 and a World Area Network (WAN). Such networks are used in corporate computer networks or in corporate intranets, and usually have access to the Internet. In LAN or WAN networks, personal computer 320 is connected to the Local Area Network 350 through a network adapter or a network interface 351. When using networks, personal computer 320 can use a modem 354 or other means for connection to a world area network, such as the Internet. Modem 354, which is an internal or an external device, is connected to system bus 323 through serial port 346. It should be clarified that these network connections are only examples and do not necessarily reflect an exact network configuration, i.e. in reality there are other means of establishing a connection using technical means of communication between computers.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. §112(f) are not to be invoked unless the specific terms "means for" or "step for" are recited in a claim.

The invention claimed is:

1. A system for excluding an executable file not having executable code from an antivirus check, the system comprising:
   a computing platform including computing hardware of at least one processor, data storage, and input/output facilities;
   computer program instructions stored on a tangible media that, when executed on the computing platform, cause the computing platform to implement:
     a check tool configured to—
       receive an executable file for an antivirus check,
       send the executable file to a breakdown tool, and
       exclude from the antivirus check an executable file not having executable code, based on a decision received from an analysis tool;
     the breakdown tool configured to—
       analyze a structure of the executable file and identify a format of the executable file by checking a heading of the executable file, and
       send information about the format of the executable file and the structure of the executable file to the analysis tool;
     the analysis tool configured to—
       select a list of conditions from a database based at least on the information about the format of the executable file, the list of conditions including a plurality of conditions for the analysis of the structure of the executable file, wherein the list of conditions selected from the database is specific to the format of the executable file,
       perform an analysis of the structure of the executable file using the selected list of conditions, the analysis including checking whether each condition from the selected list of conditions is met,
       build a result based on the analysis, the result including information on whether each checked condition is met,
       issue a decision based on the result, wherein the decision is of the absence of executable code in the executable file when all conditions from the list of conditions are met,
       send the issued decision to the check tool; and
     a database operably coupled to the analysis tool and configured to store lists of conditions.

2. The system of claim 1, wherein the plurality of file formats includes new executable (NE) formats, dynamic link library (DLL) formats, resource file formats, and executable DOS file formats.

3. The system of claim 2, wherein the dynamic link library (DLL) format is a Native DLL or a .NET Assembly DLL.

4. The system of claim 1, wherein the analysis of the structure of the executable file includes a determination of whether one or more sections of the executable file can be executed.

5. The system of claim 1, wherein the analysis of the structure of the executable file includes a determination of an entry point of program code of the executable file.

6. The system of claim 1, wherein the executable file is a .NET Assembly dynamic library (DLL) and the list of conditions includes—
   a point of entry to the _CorDllMain function of the dynamic library,
   whether the _CorDllMain function is imported from mscoree.dll,
   an export table address and an export table size of an export table section of the dynamic library,
   a thread local storage table address and a thread local storage table size of a thread local storage table of the dynamic library,
   a metadata address and a metadata size of a .NET MetaData section of the dynamic library,
   a native header address and a native header size of a ManagedNativeHeader structure of the dynamic library,
   a presence of manageable resource size of the dynamic library, or
   whether a MaskValid field of the dynamic library has bits related to tables of MethodDef, MethodPtr, MethodSemantics, MethodImpl, or MetodSpec.

7. The system of claim 1, wherein the check tool is further configured to conduct an antivirus check, and a type of antivirus check by the check tool is determined based on an unmet condition from the list of conditions.

8. The system of claim 7, wherein the unmet condition is whether an address of an exports section is zero and a size of the exports section is zero, and wherein the antivirus check is a signature analysis of the exports section.

9. The system of claim 1, further comprising an antivirus server communicatively coupled to the database over the Internet, wherein the antivirus server is configured to transmit updates to the list of conditions.

10. The system of claim 1, wherein the check tool is further configured to intercept a loading of the executable file.

11. The system of claim 1, wherein the list of conditions includes a first condition and a second condition, and wherein if the first condition is not met, the analysis tool is configured to interrupt a checking of the second condition and send the issued decision to the check tool.

12. The system of claim 1, wherein the system is executed on a computing platform including computing hardware of at least one processor, data storage, and input/output facilities, and wherein the check tool, the breakdown tool, and the analysis tool are computer program instructions stored on a tangible media executed on the computing platform.

13. A method for excluding an executable file not having executable code from an antivirus check on a computing platform including computing hardware of at least one processor, data storage, and input/output facilities, the method comprising:
   receiving, using a check tool implemented on the computing hardware, the executable file for an antivirus check;
   analyzing, using a breakdown tool implemented on the computing hardware, a structure of the executable file, and identifying a format of the executable file by checking a heading of the executable file;
   selecting, using an analysis tool implemented on the computing hardware, a list of conditions from a database based at least on the information about the format of the executable file, the list of conditions including a plurality of conditions for the analysis of the structure of the executable file, wherein the list of conditions selected from the database is specific to the format of the executable file;
   analyzing, using the analysis tool, the structure of the executable file using the selected list of conditions, the analysis including checking whether each condition from the selected list of conditions is met;
   building a result with the check tool based on the analyzing, the result including information on whether each checked condition is met;

issuing a decision based on the result, wherein the decision is of the absence of executable code in the executable file when all conditions from the list of conditions are met; and excluding from the antivirus check, using the check tool, the executable file not having executable code, based on the issued decision.

14. The method of claim 13, wherein the plurality of file formats includes new executable (NE) formats, dynamic link library (DLL) formats, resource file formats, and executable DOS file formats.

15. The system of claim 14, wherein the dynamic link library (DLL) format is a Native DLL or a .NET Assembly DLL.

16. The method of claim 13, wherein analyzing the structure of the executable file includes a determination of whether one or more sections of the executable file can be executed.

17. The method of claim 13, wherein analyzing the structure of the executable file includes a determination of an entry point of program code of the executable file.

18. The method of claim 13, further comprising conducting an antivirus check with the check tool, wherein a type of antivirus check is determined based on an unmet condition from the list of conditions.

19. The method of claim 13, further comprising receiving updates to the list of conditions from an antivirus server.

20. The method of claim 13, further comprising intercepting a loading of the executable file with the check tool.

21. The method of claim 13, wherein the list of conditions includes a first condition and a second condition, the method further comprising interrupting a checking of the second condition with the analysis tool and sending the issued decision to the check tool if the first condition is not met.

22. The method of claim 13, wherein the check tool, the breakdown tool, and the analysis tool are computer program instructions stored on a tangible media executed on the computing platform.

* * * * *